No. 612,730.  
Patented Oct. 18, 1898.
G. C. HUGHES.
KNOB ATTACHMENT.
(Application filed Nov. 19, 1897.)
(No Model.)
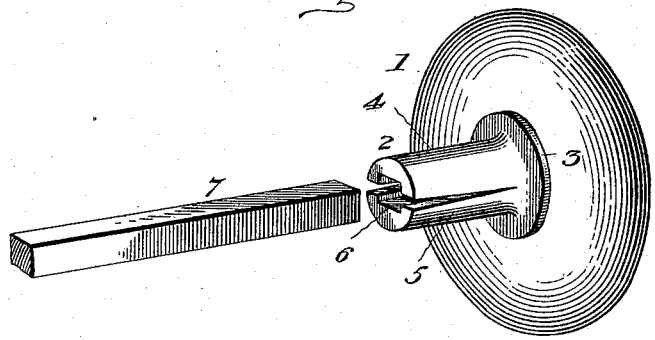
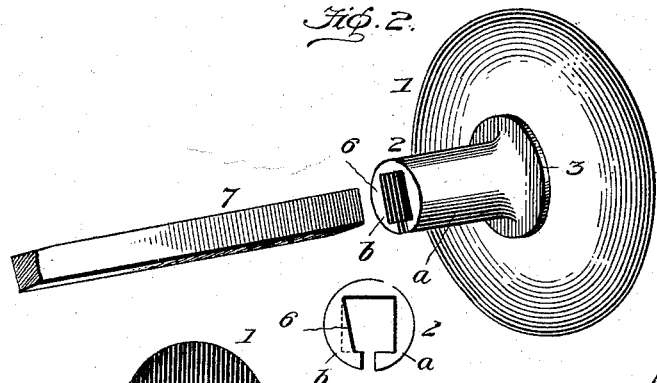
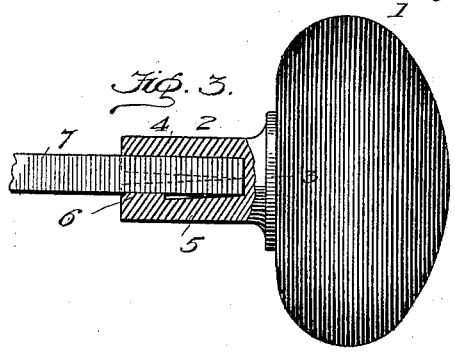
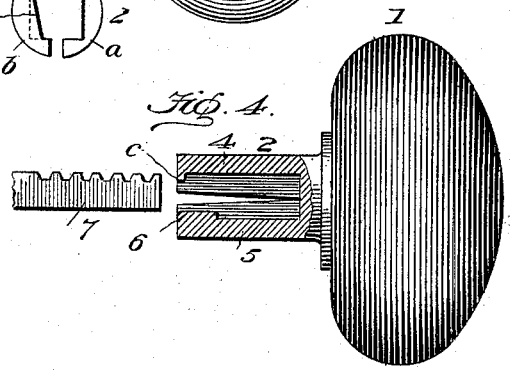
Witnesses
Inventor  
George C. Hughes

UNITED STATES PATENT OFFICE.

GEORGE CLARK HUGHES, OF PADUCAH, KENTUCKY.

KNOB ATTACHMENT.

SPECIFICATION forming part of Letters Patent No. 612,730, dated October 18, 1898.

Application filed November 19, 1897. Serial No. 659,206. (No model.)

*To all whom it may concern:*

Be it known that I, GEORGE CLARK HUGHES, a citizen of the United States, residing at Paducah, in the county of McCracken and State of Kentucky, have invented certain new and useful Improvements in Door-Knobs; and I do declare the following to be a full, clear, and exact description of the invention, such as will enable others skilled in the art to which it appertains to make and use the same.

The invention relates to door-knobs; and the object is to provide simple and efficient means for securing the shank of a door-knob to its spindle without the employment of screws or like fastening devices.

With this object in view the invention consists in certain features of construction and combination of parts, which will hereinafter be fully described and claimed.

In the drawings, Figure 1 is a perspective view of a door-knob, its attached shank, and a portion of the spindle. Fig. 2 is a similar view of another form of my invention, in which the shank is shown as being provided with but one slit. Fig. 3 is a longitudinal sectional view through Fig. 1, showing the parts assembled. Fig. 4 is a similar view of another form of my invention.

In the drawings, 1 denotes the door-knob, and 2 its shank. As shown in Figs. 1, 3, and 4, the shank is provided with a slit on diametrically opposite sides, extending to the collar 3, to form spring-jaws 4 and 5, while in Fig. 2 the shank is shown with but one slit on its under side, which forms spring-jaws $a$ and $b$. At the entrance to these jaws is provided the transverse rib or thickened portion 6, which extends into and along the inside of the shank only a part of the length of said shank. 7 denotes a spindle angular in cross-section to correspond with the opening in the shank and of greater diameter than the normal diameter of the shank. The jaws of the shank are spread apart by a blade or other tool, and the spindle is forced into the shank, and owing to the powerful spring action of the jaws the shank is firmly held by friction in position, the rib serving to bind the parts together and the grip being determined by the thickness of the rib.

I find the construction shown in Fig. 2, in which one slit is used, to be particularly applicable to bronze shanks, while the constructions shown in Figs. 1, 3, and 4, in which two slits are used, are designed for cast-iron shanks, one slit not affording ample resiliency for the spreading of the jaws when made of cast-iron.

In the construction shown in Fig. 4 I provide one of the jaws of the shank with a tooth $c$ and the spindle with a longitudinal row of indentations to be engaged by the tooth.

Although I have specifically shown and described the construction and operation of my invention, I do not desire to be confined to the same, as such changes or modifications may be made as clearly fall within the scope of my invention without departing from the spirit thereof.

Having thus described my invention, what I claim as new, and desire to secure by Letters Patent, is—

1. The combination with the shank, which is split longitudinally to form spring-jaws, said shank being provided with a bore having a rib at the entrance thereof, of a spindle corresponding in cross-section to the bore of the shank and having a diameter greater than the normal diameter of the bore, whereby when said jaws are separated to receive the spindle, the tension of said jaws will be exerted to hold the spindle in position, substantially as set forth.

2. The combination with the shank which is split longitudinally to form spring-jaws, said shank being provided with a bore having a rib and a tooth at the entrance thereof, of a spindle corresponding in cross-section to the bore of the shank and having a diameter greater than the normal diameter of the bore, and provided with indentations to be engaged by the tooth, whereby when said jaws are separated to receive the spindle the tension of the jaws will be exerted to hold the spindle in position, substantially as described.

In testimony whereof I hereunto affix my signature in presence of two witnesses.

GEO. CLARK HUGHES.

Witnesses:
D. B. SANDERS,
WM. HUGHES.